US009095872B2

(12) United States Patent
Topf et al.

(10) Patent No.: US 9,095,872 B2
(45) Date of Patent: Aug. 4, 2015

(54) FEEDBACK CONTROL SYSTEM FOR PERFORMING FLUID DISPENSING OPERATIONS

(71) Applicant: The Boeing Company, Chicago, IL (US)

(72) Inventors: Richard Philip Topf, Orange, CA (US); Martin Guirguis, Long Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 20 days.

(21) Appl. No.: 13/951,817

(22) Filed: Jul. 26, 2013

(65) Prior Publication Data

US 2015/0028051 A1 Jan. 29, 2015

(51) Int. Cl.

| | |
|---|---|
| ***B05C 17/015*** | (2006.01) |
| ***B65D 83/62*** | (2006.01) |
| ***G01K 11/08*** | (2006.01) |
| ***B05C 11/10*** | (2006.01) |
| *B05B 12/10* | (2006.01) |
| *B05C 17/01* | (2006.01) |

(52) U.S. Cl.

CPC ............ *B05C 11/1013* (2013.01); *B05B 12/10* (2013.01); *B05C 17/0103* (2013.01); *B05C 17/015* (2013.01)

(58) Field of Classification Search

CPC .. G01K 11/08; A47K 5/1217; B05C 17/0103; B05C 11/1013; B05C 17/015; B65D 83/0005; B65D 83/62

USPC ............... 222/1, 52, 54–55, 61, 63, 158, 327, 222/386, 386.5, 333

See application file for complete search history.

(56) References Cited

U.S. PATENT DOCUMENTS

| | | | |
|---|---|---|---|
| 1,988,557 | A | 1/1935 | Jecker |
| 2,126,999 | A | 8/1938 | Mitchell |
| 2,227,792 | A | 1/1941 | Norton, Jr. |
| 2,608,705 | A | 9/1952 | Duff |
| 2,609,974 | A | 9/1952 | Brous |
| 2,824,443 | A | 2/1958 | Ames |
| 2,978,722 | A | 4/1961 | Kusakabe |
| 3,661,679 | A | 5/1972 | Law |
| 3,746,253 | A | 7/1973 | Walberg |
| 3,888,421 | A | 6/1975 | Chow |

(Continued)

FOREIGN PATENT DOCUMENTS

| | | | |
|---|---|---|---|
| CN | 101858456 | B | 12/2012 |
| DE | 102004027789 | A1 | 2/2005 |

(Continued)

OTHER PUBLICATIONS

International Search Report and Written Opinion, dated Apr. 4, 2014, regarding Application No. PCT/US2014/011879, 9 pages.

(Continued)

*Primary Examiner* — Frederick C Nicolas

(74) *Attorney, Agent, or Firm* — Yee & Associates, P.C.

(57) ABSTRACT

A method and apparatus for controlling a dispensing device. Sensor data about fluid that is being dispensed through the dispensing device may be received. A pressure of the fluid may be identified using the sensor data. A tool configured to move the fluid from a fluid source to the dispensing device based on the pressure identified to control a rate at which the fluid flows from the fluid source to the dispensing device may be controlled.

27 Claims, 8 Drawing Sheets

(56) References Cited

U.S. PATENT DOCUMENTS

| | | | | | |
|---|---|---|---|---|---|
| 4,570,834 | A | | 2/1986 | Ward | |
| 4,698,005 | A | | 10/1987 | Kikuchi et al. | |
| 4,925,061 | A | | 5/1990 | Jeromson, Jr. et al. | |
| 4,932,094 | A | | 6/1990 | McCowin | |
| 4,948,016 | A | * | 8/1990 | Summons et al. | 222/158 |
| 4,989,792 | A | | 2/1991 | Claasen | |
| 5,017,113 | A | | 5/1991 | Heaton et al. | |
| 5,271,521 | A | * | 12/1993 | Noss et al. | 222/1 |
| 5,271,537 | A | | 12/1993 | Johnson | |
| 5,319,568 | A | * | 6/1994 | Bezaire | 700/123 |
| 5,346,380 | A | | 9/1994 | Ables | |
| 5,462,199 | A | * | 10/1995 | Lenhardt | 222/54 |
| 5,480,487 | A | | 1/1996 | Figini et al. | |
| 5,571,538 | A | | 11/1996 | Cloud | |
| 5,615,804 | A | | 4/1997 | Brown | |
| 5,803,367 | A | | 9/1998 | Heard et al. | |
| 5,906,296 | A | | 5/1999 | Martindale et al. | |
| 5,920,974 | A | | 7/1999 | Bullen | |
| 5,976,631 | A | | 11/1999 | Ramachandran | |
| 5,992,686 | A | * | 11/1999 | Cline et al. | 222/1 |
| 5,995,909 | A | * | 11/1999 | Bretmersky et al. | 702/50 |
| 6,001,181 | A | | 12/1999 | Bullen | |
| 6,082,587 | A | | 7/2000 | Martindale et al. | |
| 6,213,354 | B1 | * | 4/2001 | Kay | 222/420 |
| 6,698,617 | B1 | | 3/2004 | Szymanski | |
| 6,739,483 | B2 | | 5/2004 | White et al. | |
| 6,935,541 | B1 | | 8/2005 | Campbell et al. | |
| 6,942,736 | B2 | * | 9/2005 | Chinander et al. | 118/692 |
| 6,986,472 | B2 | | 1/2006 | Gordon | |
| 7,172,096 | B2 | * | 2/2007 | O'Dougherty | 222/100 |
| 7,275,663 | B2 | | 10/2007 | Campbell et al. | |
| 7,578,416 | B2 | * | 8/2009 | Underwood | 222/190 |
| 7,592,033 | B2 | | 9/2009 | Buckley et al. | |
| 7,815,132 | B2 | | 10/2010 | Baltz | |
| 7,922,107 | B2 | | 4/2011 | Fox | |
| 1,003,650 | A1 | | 9/2011 | Redin | |
| 8,181,822 | B2 | * | 5/2012 | Doelman et al. | 222/1 |
| 8,453,876 | B2 | | 6/2013 | Miller | |
| 8,534,499 | B2 | * | 9/2013 | Williams et al. | 222/55 |
| 2005/0145724 | A1 | | 7/2005 | Blette et al. | |
| 2010/0260531 | A1 | | 10/2010 | Rademacher | |
| 2011/0297175 | A1 | | 12/2011 | Pires et al. | |
| 2012/0273115 | A1 | | 11/2012 | Suzuki et al. | |
| 2015/0044376 | A1 | | 2/2015 | Topf et al. | |

FOREIGN PATENT DOCUMENTS

| | | | |
|---|---|---|---|
| DE | 202005005619 | U1 | 2/2006 |
| DE | 102004042211 | A1 | 3/2006 |
| DE | 102008010169 | A1 | 9/2009 |
| DE | 202007019244 | U1 | 8/2011 |
| DE | 102010030375 | A1 | 12/2011 |
| EP | 0181483 | A1 | 5/1986 |
| EP | 1245348 | A1 | 10/2002 |
| EP | 1425107 | B1 | 5/2006 |
| EP | 2277631 | A1 | 1/2011 |
| EP | 2839885 | A1 | 2/2015 |
| FR | 2508350 | A1 | 12/1982 |
| GB | 2282554 | A | 4/1995 |
| GB | 2481299 | A | 12/2011 |
| JP | 2002059049 | A | 2/2002 |
| WO | WO0067915 | A1 | 11/2000 |
| WO | WO2005012845 | A2 | 2/2005 |
| WO | WO2010093494 | A1 | 8/2010 |
| WO | WO2011108358 | A2 | 9/2011 |
| WO | WO2013112178 | A1 | 8/2013 |

OTHER PUBLICATIONS

International Search Report and Written Opinion, dated Jun. 4, 2014, regarding Application No. PCT/US2014/033738, 9 pages.

"Dispense Valves for Adhesives, Sealants, Lubricants, Epoxy, Polyurethane, Silicone & More," Kiss, No-Drip, Snuf-Bak, Tip-Seal,Manual, Metering, and High Flow valve part specifications, Sealant Equipment and Engineering, Inc., 12 pages, accessed Apr. 9, 2013, http://www.sealantequipment.com/dispensevalves-1part.htm.

"No-Drip Air Operated Fluid Dispense Valve," 2100-108 Series part specifications, Sealant Equipment and Engineering, Inc., 2 pages, accessed Apr. 9, 2013, http://www.sealantequipment.com/pdf/DispenseValves/2100-108%20No-Drip%20Valves.pdf.

"Compliance Nozzle," 1208-178-000 part specifications, Sealant Equipment and Engineering, Inc., 2 pages, accessed Apr. 9, 2013, http://sealantequipment.com/pdf/DispenseValves/1208-178%20Compliance%20Nozzle.pdf.

Tomuta et al., "Method and Apparatus for Exchanging Nozzles and Tips for a Fluid Dispensing System," U.S. Appl. No. 13/973,528, filed Aug. 22, 2013, 64 pages.

Tomuta et al., "Fluid Application Device," U.S. Appl. No. 14/016,846, filed Sep. 3, 2013, 59 pages.

Tomuta et al., "Fluid Application Device," U.S. Appl. No. 13/769,569, filed Feb. 18, 2013, 63 pages.

Topf et al., "Control Valve Having a Disposable Valve Body," U.S. Appl. No. 13/886,535, filed May 3, 2013, 52 pages.

Davancens et al., "Robotic Sealant and End Effector," U.S. Appl. No. 12/842,247, filed Jul. 23, 2010, 41 pages.

Office Action, dated Oct. 1, 2014, regarding U.S. Appl. No. 13/886,535, 17 pages.

Notice of Allowance, dated Dec. 19, 2014, regarding U.S. Appl. No. 13/886,535, 13 pages.

International Search Report and Written Opinion, dated Oct. 7, 2014, regarding Application No. PCT/US2014/040989, 10 pages.

Extended European Search Report, dated Oct. 15, 2014, regarding Application No. 14175644.5, 6 pages.

International Search Report and Written Opinion, dated Oct. 15, 2014, regarding Application No. PCT/US2014/045018, 9 pages.

Extended European Search Report, dated Jan. 8, 2015, regarding Application No. EP14180160.5, 6 pages.

Office Action, dated May 11, 2015, regarding U.S. Appl. No. 14/016,846, 36 pages.

* cited by examiner

FEEDBACK CONTROL SYSTEM FOR PERFORMING FLUID DISPENSING OPERATIONS

BACKGROUND INFORMATION

1. Field

The present disclosure relates generally to fluid dispensing operations and, in particular, to a feedback control system for performing fluid dispensing operations. Still more particularly, the present disclosure relates to a method and apparatus for using pressure data and temperature data about the fluid being dispensed from a dispensing device to control a rate at which fluid flows to the dispensing device.

2. Background

Oftentimes, fluid dispensing operations, such as, for example, without limitation, sealant dispensing operations, are performed manually. However, performing these operations manually may be more time-consuming and labor-intensive than desired. Further, ensuring that a fluid, such as sealant, is dispensed at a substantially constant rate may be more difficult than desired when performing these operations manually.

With some currently available sealant dispensing systems, a pneumatic hand-held dispensing device may be operated by a human operator. The human operator may push a trigger button that controls a pressure applied to a sealant, thereby controlling the rate at which the sealant is dispensed. However, when performing this type of operation, the pressure applied to the sealant may be varied, resulting in uneven dispensing and application of the sealant.

In other currently available sealant dispensing systems, a mechanical plunger may be moved through a sealant cartridge at a substantially constant speed. In other words, the mechanical plunger may be moved a selected distance per second. The distance moved by the plunger may be related to the volume of sealant extruded from the sealant dispensing system. However, the volume of sealant extruded may not remain constant when performing this type of operation due to variations in the pressure of the sealant within the sealant cartridge.

Additionally, with some currently available sealant dispensing systems, the insertion, removal, and/or replacement of sealant cartridges may require more time than desired. In some cases, inserting, removing, and/or replacing sealant cartridges in sealant dispensing systems that use mechanical systems to create a motive force that dispenses the sealant from a sealant cartridge towards a nozzle or exit of the sealant dispensing system may be more complicated than desired. Further, oftentimes, a human operator may be needed to complete the insertion, removal, and/or replacement of a sealant cartridge. Therefore, it would be desirable to have a method and apparatus that take into account at least some of the issues discussed above, as well as other possible issues.

SUMMARY

In one illustrative embodiment, an apparatus may comprise a sensor system and a controller. The sensor system may be associated with a dispensing device and configured to generate sensor data about fluid being dispensed from the dispensing device. The controller may be configured to receive the sensor data, identify a pressure of the fluid using the sensor data, and control a tool configured to move the fluid from a fluid source to the dispensing device based on the pressure identified to control a rate at which the fluid flows from the fluid source to the dispensing device.

In another illustrative embodiment, a fluid dispensing system may comprises a platform, a retaining structure associated with the platform, a dispensing device, a sensor system associated with the dispensing device, a controller, and a door mechanism associated with the retaining structure. The retaining structure may be configured to hold a fluid source. The dispensing device may be configured to receive a fluid from the fluid source and dispense the fluid. The sensor system comprises at least one of a pressure sensor and a temperature sensor. The pressure sensor may be configured to measure a pressure of the fluid being dispensed from the dispensing device to generate pressure data for the fluid. The temperature sensor may be configured to measure a temperature of the fluid being dispensed from the dispensing device to generate temperature data for the fluid. The controller may be configured to receive the pressure data and the temperature data. The controller may be further configured to use the pressure data, the temperature data, and a feedback control algorithm to generate a number of commands to control a tool to control a rate at which the fluid flows from the fluid source to the dispensing device such that a pressure of the fluid being dispensed from the dispensing device remains substantially constant. The tool may be selected from one of a mechanical tool and a pneumatic tool. The door mechanism may be configured to be moved between an open state and a closed state. The open state may allow the fluid source to be either removed from or inserted into the retaining structure. The closed state may form a hermetic seal with the fluid source.

In yet another illustrative embodiment, a method for controlling a dispensing device may be provided. Sensor data about fluid that is being dispensed through a dispensing device may be received. A pressure of the fluid may be identified using the sensor data. A tool configured to move the fluid from a fluid source to the dispensing device based on the pressure identified to control a rate at which the fluid flows from the fluid source to the dispensing device may be controlled.

In still yet another illustrative embodiment, a method for controlling a dispensing of fluid may be provided. A door mechanism associated with a retaining structure may be moved into an open state to allow a fluid source to be inserted into the retaining structure configured to hold the fluid source. The fluid source may hold the fluid. The door mechanism may be moved into a closed state to form a hermetic seal with the fluid source. The fluid may be dispensed from the dispensing device configured to receive the fluid from the fluid source. Sensor data about the fluid that is being dispensed through the dispensing device may be generated using a sensor system associated with the dispensing device. The sensor data may include at least one of temperature data and pressure data for the fluid. The sensor data may be received at a controller. A number of commands may be generated using the sensor data and a feedback control algorithm to control a tool that is configured to control a rate at which the fluid flows from the fluid source to the dispensing device such that a pressure of the fluid being dispensed from the dispensing device remains substantially constant. The number of commands may be sent to the tool to control the tool.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have an automated fluid dispensing system. The illustrative embodiments recognize and take into account that automating fluid dispensing operations may allow fluid to be dispensed more accurately and consistently. Thus, the illustrative embodiments provide a method and apparatus for controlling a fluid dispensing device using automated feedback control. Further, the illustrative embodiments provide a method and apparatus for use in automating the insertion, removal, and replacement of fluid cartridges within fluid dispensing systems.

Figure 1:
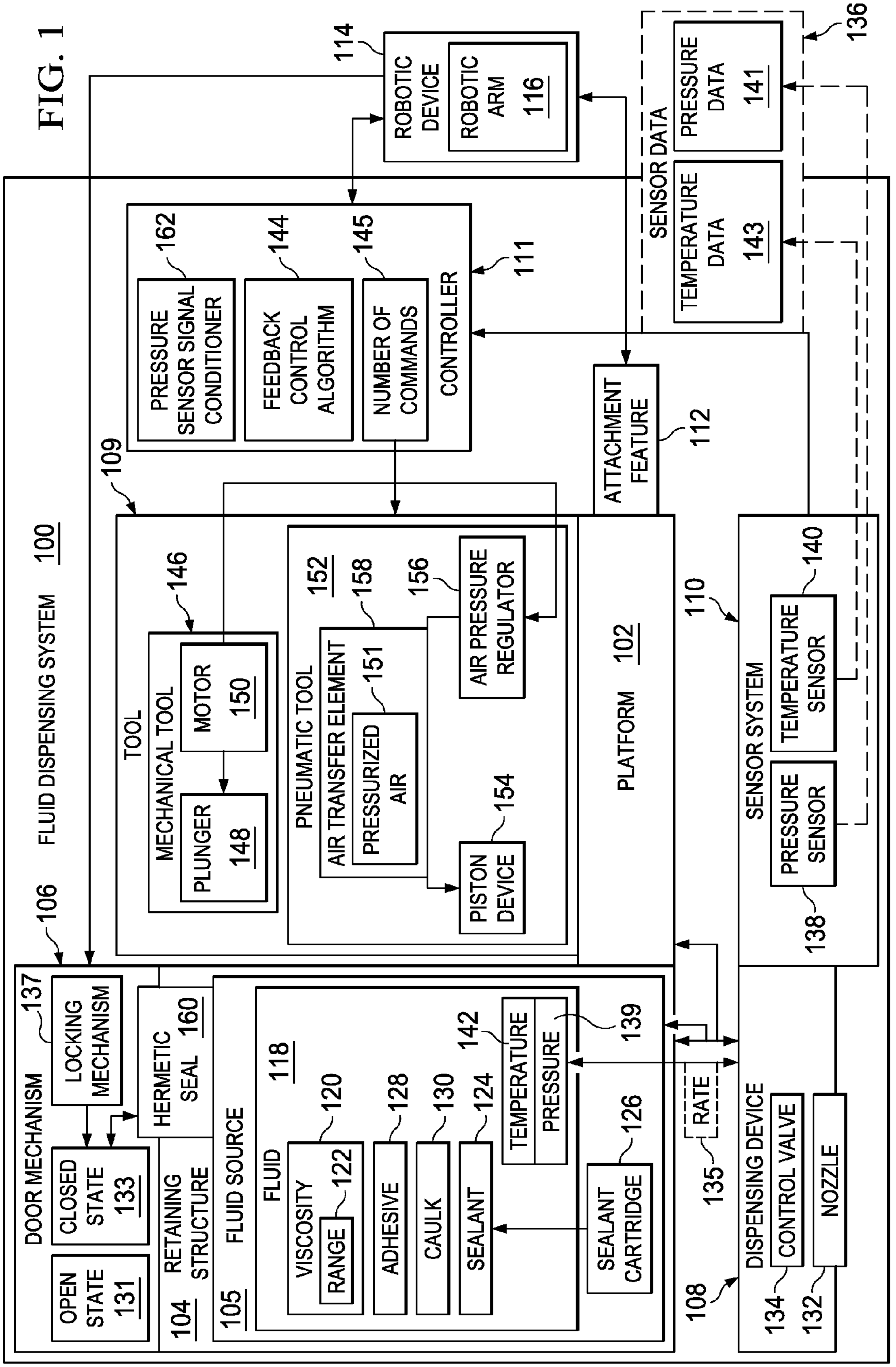
FIG. 1 is an illustration of a fluid dispensing system in the form of a block diagram in accordance with an illustrative embodiment.

Referring now to the figures and, in particular, with reference to FIG. 1, an illustration of a fluid dispensing system is depicted in the form of a block diagram in accordance with an illustrative embodiment. In this illustrative example, fluid dispensing system 100 may include platform 102, retaining structure 104, door mechanism 106, dispensing device 108, tool 109, sensor system 110, controller 111, and attachment feature 112.

Attachment feature 112 may be associated with platform 102. As used herein, when one component is "associated" with another component, the association is a physical association in the depicted examples.

For example, without limitation, a first component, such as attachment feature 112, may be considered to be associated with a second component, such as platform 102, by being secured to the second component, bonded to the second component, mounted to the second component, welded to the second component, fastened to the second component, and/or connected to the second component in some other suitable manner. The first component also may be connected to the second component using a third component. Further, the first component may be considered to be associated with the second component by being formed as part of and/or as an extension of the second component.

Attachment feature 112 may be configured for use in attaching platform 102, and thus fluid dispensing system 100, to robotic device 114. Robotic device 114 may take the form of, for example, without limitation, robotic arm 116. In this manner, fluid dispensing system 100 may be considered an end effector for robotic arm 116.

As depicted, retaining structure 104 may also be associated with platform 102. Retaining structure 104 may be configured to retain, or hold, fluid source 105. Fluid source 105 may hold fluid 118. In this illustrative example, fluid 118 may be a compressible fluid. A compressible fluid may be comprised of one or more gases and/or liquids that can be compressed.

In this illustrative example, fluid 118 may have viscosity 120 within range 122. In one illustrative example, fluid 118 may take the form of sealant 124 and fluid source 105 may take the form of sealant cartridge 126. Sealant 124 may be compressible. Range 122 of viscosity 120 for sealant 124 may be between, for example, without limitation, about 1 centipoise and about 100 centipoise.

Of course, in other illustrative examples, fluid 118 may take some other form. For example, without limitation, fluid 118 may take the form of adhesive 128, caulk 130, or some other type of fluid.

As depicted, door mechanism 106 may be associated with retaining structure 104. Door mechanism 106 may comprise a number of different components. For example, without limitation, door mechanism 106 may comprise at least one of a latch mechanism, a hinge, a clamping mechanism, an air cylinder, a number of fasteners, a number of moveable joints, a number of bearings, or some other type of component.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Door mechanism 106 may be configured to allow access to fluid source 105 retained by retaining structure 104. In particular, door mechanism 106 may be moved between open state 131 and closed state 133. Door mechanism 106 may be moved into open state 131 to allow fluid source 105 to be either inserted into or removed from retaining structure 104. For example, without limitation, robotic device 114 may be configured to move door mechanism 106 into open state 131 such that fluid source 105 held within retaining structure 104 may be removed and replaced with a new fluid source.

Further, robotic device 114 may be configured to move door mechanism 106 into closed state 133 to cover fluid source 105 and ensure that fluid source 105 cannot be moved out of retaining structure 104. In this manner, the process of replacing sealant cartridges may be automated.

In this illustrative example, door mechanism 106 may have locking mechanism 137. Both locking mechanism 137 and door mechanism 106 may be operated by robotic device 114.

Locking mechanism 137 may be configured to lock door mechanism 106 in closed state 133 such that door mechanism 106 does not move into open state 131 during the dispensing of fluid 118. In particular, locking mechanism 137 may ensure that the increase in air pressure within fluid source 105 and/or retaining structure 104 that occurs during the dispensing of fluid 118 does not cause door mechanism 106 to move into open state 131.

For example, without limitation, door mechanism 106 may move into open state 131 when the air pressure within fluid source 105 and/or retaining structure 104 increases. Locking mechanism 137 may comprise one or more clamping devices used to prevent door mechanism 106 from moving from closed state 133 to open state 131 during the dispensing of fluid 118. Locking mechanism 137 may comprise any number of components, depending on the implementation. Locking mechanism 137 may include at least one of, for example, without limitation, a clamping device, a lever clamp, or some other type of locking device.

In this illustrative example, dispensing device 108 may be associated with at least one of retaining structure 104 and fluid source 105. In particular, dispensing device 108 may be associated with at least one of retaining structure 104 and fluid source 105 in a manner such that fluid 118 may be allowed to flow from fluid source 105 into dispensing device 108.

As depicted, dispensing device 108 may be associated with nozzle 132. Fluid 118 may be configured to be dispensed from, or exit, dispensing device 108 through nozzle 132. Nozzle 132 may be formed as part of dispensing device 108 in some cases. In other cases, nozzle 132 may be a separate component that may be attached to dispensing device 108.

In some illustrative examples, dispensing device 108 may include control valve 134. Control valve 134 may be used to control the flow of fluid 118 received from fluid source 105 through dispensing device 108 and/or out of dispensing device 108.

Tool 109 may be associated with at least one of platform 102, retaining structure 104, and dispensing device 108. Tool 109 may be used to move fluid 118 held within fluid source 105 to dispensing device 108. In particular, tool 109 may control rate 135 at which fluid 118 flows from fluid source 105 to dispensing device 108. For example, without limitation, tool 109 may apply force, or pressure, to fluid source 105, and thereby fluid 118 within fluid source 105, to move fluid 118 to dispensing device 108.

In this illustrative example, sensor system 110 may be associated with dispensing device 108. Sensor system 110 may be configured to generate sensor data 136 about fluid 118 being dispensed from dispensing device 108. For example, without limitation, sensor system 110 may include pressure sensor 138 and temperature sensor 140.

Pressure sensor 138 may be configured to measure pressure 139 of fluid 118 being dispensed from dispensing device 108 to generate pressure data 141 for fluid 118. Temperature sensor 140 may be configured to measure temperature 142 of fluid 118 being dispensed from dispensing device 108 to generate temperature data 143 for fluid 118.

Sensor system 110 may be configured to send sensor data 136 to controller 111 using one or more communications links. These communications links may include at least one of a wired communications link, a wireless communications link, and an optical communications link.

Controller 111 may be implemented using hardware, software, or a combination of the two. In one illustrative example, controller 111 may be implanted using a microprocessor associated with platform 102. Of course, in other illustrative examples, controller 111 may be implemented using at least one of a microprocessor, a number of computers, a computer system, an integrated circuit, an electronic circuit, or some other type of device.

Controller 111 may be configured to use sensor data 136 to control tool 109. For example, without limitation, controller 111 may use sensor data 136 and feedback control algorithm 144 to generate number of commands 145 for tool 109.

Controller 111 may use temperature data 143 to identify temperature 142 of fluid 118 within fluid source 105. Temperature 142 may be an indication of viscosity 122 of fluid 118. For example, without limitation, fluid 118 having a higher temperature may have a lower viscosity than fluid 118 having a lower temperature. In other words, fluid 118 having a higher temperature may flow more easily than fluid 118 having a lower temperature.

Further, controller 111 may use pressure data 141 to identify pressure 139 of fluid 118 within fluid source 105. Based on temperature 142 and pressure 139 of fluid 118, controller 111 may determine whether fluid 118 is flowing as desired, more easily than desired, or less easily than desired. Based on a determination of how fluid 118 is flowing, controller 111 may determine whether the force, or pressure, being applied to fluid 118 within fluid source 105 by tool 109 needs to be adjusted.

For example, without limitation, when temperature 142 and pressure 139 indicate that fluid 118 is flowing more easily than desired, controller 111 may generate number of commands 145 that will cause tool 109 to reduce the force, or pressure, being applied to fluid 118 within fluid source 105. When temperature 142 and pressure 139 indicate that fluid 118 if flowing less easily than desired, controller 111 may generate number of commands 145 that will cause tool 109 to increase the force, or pressure, being applied to fluid 118 within fluid source 105.

As one illustrative example, tool 109 may take the form of mechanical tool 146. Mechanical tool 146 may comprise plunger 148 and motor 150. Plunger 148 may be configured to be moved relative to fluid source 105 to control rate 135 at which fluid 118 flows from fluid source 105 to dispensing device 108. In particular, plunger 148 may be pushed towards fluid 118 held within fluid source 105 to apply pressure to fluid 118 such that fluid 118 may be extruded from fluid source 105 and sent to dispensing device 108. The amount of pressure placed on fluid 118 by plunger 148 may determine rate 135 at which fluid 118 flows from fluid source 105 to dispensing device 108.

The movement of plunger 148 may be controlled by motor 150. Controller 111 may send number of commands 145 to motor 150 to operate motor 150, and thereby control the movement of plunger 148. In other words, controller 111 may control the force with which plunger 148 pushes against fluid source 105 in order to apply pressure to fluid 118 within fluid source 105. In particular, controller 111 may evaluate sensor data 136 using feedback control algorithm 144 to determine whether fluid 118 is flowing to dispensing device 108 at a desired rate. If fluid 118 is not flowing at the desired rate, controller 111 may send number of commands 145 to motor 150 to adjust the operation of motor 150 such that rate 135 may be adjusted.

In another illustrative example, tool 109 may take the form of pneumatic tool 152. Pneumatic tool 152 may comprise piston device 154 and air pressure regulator 156. Piston device 154 may be configured to move relative to fluid source 105 to control rate 135 at which fluid 118 flows from fluid source 105 to dispensing device 108. In particular, piston device 154 may be pushed towards fluid 118 held within fluid source 105 by pressurized air 151 to apply pressure to fluid 118 such that fluid 118 may be extruded from fluid source 105 and sent to dispensing device 108. The pressure applied by piston device 154 may be applied directly by piston device 154 or indirectly by air between piston device 154 and fluid 118 in fluid source 105.

The amount of pressure placed on fluid 118 by piston device 154 may determine rate 135 at which fluid 118 flows from fluid source 105 to dispensing device 108. The movement of piston device 154 may be controlled by air pressure regulator 156. Air pressure regulator 156 may regulate the flow and/or pressure of pressurized air 151 flowing towards piston device 154 to control the movement of piston device 154.

Pressurized air 151 may flow from air pressure regulator 156 through air transfer element 158. Air transfer element 158 may comprise any number of tubes, hoses, pipes, and/or other types of hollow elongate members configured to allow the flow of air. Air transfer element 158 may be connected to air pressure regulator 156 and at least one of retaining structure 104, piston device 154, or fluid source 105. When door mechanism 106 is in closed state 133, door mechanism 106 may provide hermetic seal 160 such that the pressure of pressurized air 151 may be maintained.

Controller 111 may send number of commands 145 to air pressure regulator 156 to operate air pressure regulator 156, and thereby control the movement of piston device 154. In particular, controller 111 may evaluate sensor data 136 using feedback control algorithm 144 to determine whether fluid 118 is flowing to dispensing device 108 at a desired rate. If fluid 118 is not flowing at the desired rate, controller 111 may send number of commands 145 to air pressure regulator 156 to adjust the flow and/or pressure of pressurized air 151 being applied towards piston device 154 such that rate 135 may be adjusted.

In this manner, controller 111 may be configured to generate number of commands 145 needed to control tool 109 using sensor data 136 and feedback control algorithm 144 such that a pressure of fluid 118 being dispensed from dispensing device 108 remains substantially constant. Thus, the process of continuously dispensing fluid 118 using fluid dispensing system 100 over some selected period of time may be automated. Sensor system 110, controller 111, and tool 109 may form a feedback control system for controlling the fluid dispensing operations performed using fluid dispensing system 100.

Of course, in other illustrative examples, it may be desirable that the pressure of fluid 118 being dispensed not be substantially constant. For example, without limitation, it may be desirable that rate 135 at which fluid 118 flows to dispensing device 108 follow some selected pattern or curve. Controller 111 may use sensor data 136 and feedback control algorithm 144 to generate number of commands 145 that allow rate 135 to be controlled such that rate 135 follows this selected pattern or curve.

The illustration of fluid dispensing system 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, in some cases, sensor system 110 may not include temperature sensor 140. Rather, sensor system 110 may include some type of device configured to directly measure viscosity 122 of fluid 118 within fluid source 105. Controller 111 may use the data provided by this type of device and pressure data 141 to control tool 109.

For example, in some cases, retaining structure 104 may not include door mechanism 106. In some illustrative examples, tool 109 may be implemented in some other manner to control rate 135 at which fluid 118 flows from fluid source 105 to dispensing device 108.

In other illustrative examples, controller 111 may be implemented as part of robotic device 114 or as part of a control unit configured to control both robotic device 114 and fluid dispensing system 100. In still other illustrative examples, air pressure regulator 156 may be implemented as part of robotic device 114.

In some illustrative examples, controller 111 may include pressure signal conditioner 162. Pressure signal conditioner 162 may be configured to receive sensor data 136 from pressure sensor 138 and amplify sensor data 136 such that sensor data 136 may be suitable for use in identifying number of commands 145. Of course, in other illustrative examples, pressure signal conditioner 162 may be separate from controller 111 and may be configured to communicate with both pressure sensor 138 and controller 111.

Figure 2:
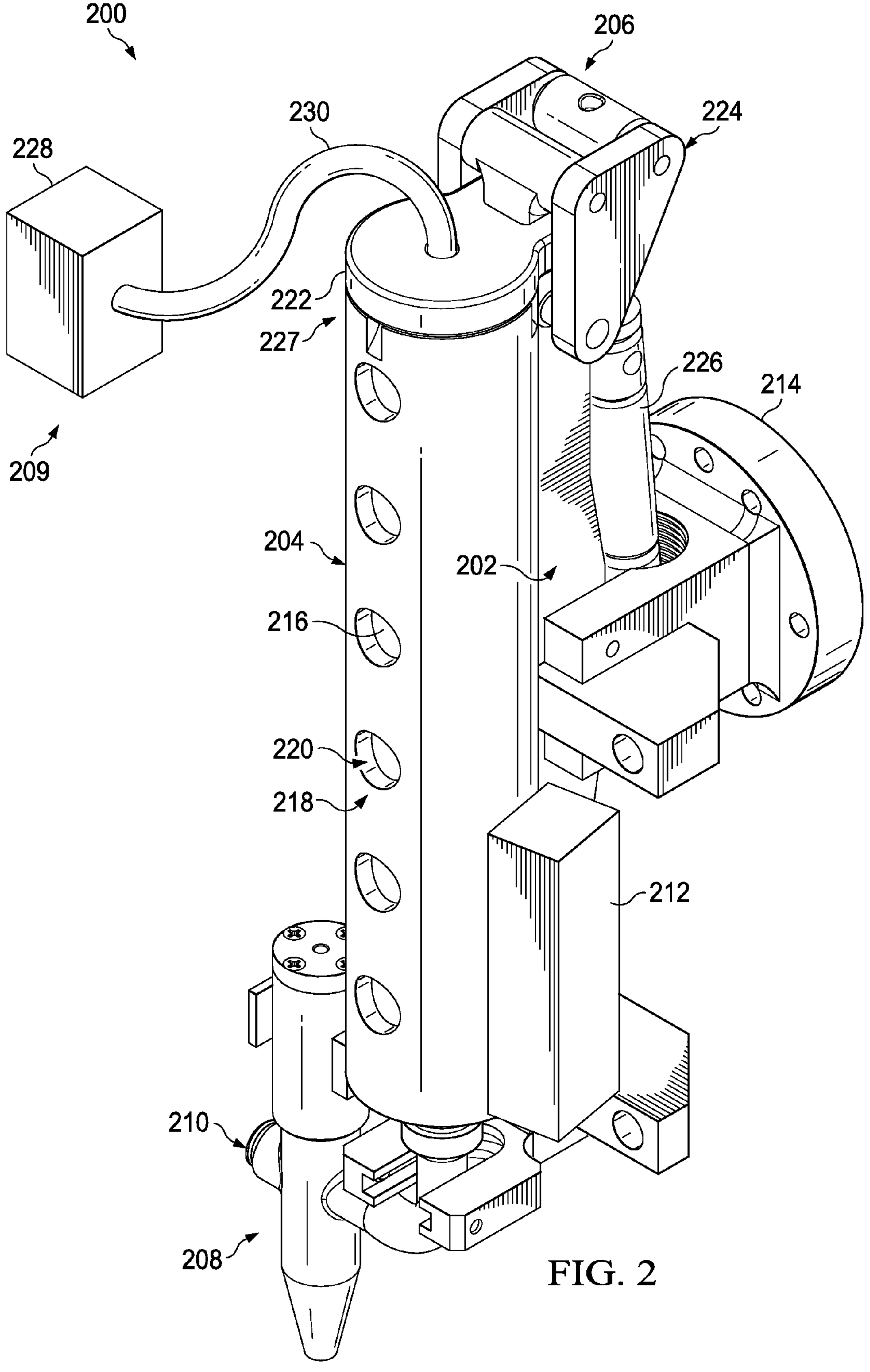
FIG. 2 is an illustration of a sealant dispensing system with a door mechanism in a closed state in accordance with an illustrative embodiment.

With reference now to FIG. 2, an illustration of a sealant dispensing system with a door mechanism in a closed state is depicted in accordance with an illustrative embodiment. In this illustrative example, sealant dispensing system 200 may be an example of one implementation for fluid dispensing system 100 in FIG. 1.

As depicted, sealant dispensing system 200 may include platform 202, retaining structure 204, door mechanism 206, dispensing device 208, pneumatic tool 209, sensor system 210, controller 212, and attachment feature 214. Platform 202, retaining structure 204, door mechanism 206, dispensing device 208, pneumatic tool 209, sensor system 210, controller 212, and attachment feature 214 may be examples of implementations for platform 102, retaining structure 104, door mechanism 106, dispensing device 108, pneumatic tool 152, sensor system 110, controller 111, and attachment feature 112, respectively, in FIG. 1.

In this illustrative example, attachment feature 214 may be associated with platform 202 and configured for use in attaching platform 202 to a robotic device, such as, for example, without limitation, robotic device 114 in FIG. 1. As depicted, retaining structure 204 may also be associated with platform 202. Retaining structure 204 may retain sealant cartridge 216. Sealant cartridge 216 may be an example of one implementation for sealant cartridge 126 in FIG. 1.

Retaining structure 204 may have level indicator 218. Level indicator 218 may take the form of plurality of holes 220 in this illustrative example. Plurality of holes 220 may allow sealant cartridge 216 to be seen. Sealant cartridge 216 may be at least partially transparent, in this illustrative example. In this manner, a level of sealant (not shown) held within sealant cartridge 216 may be visible. Plurality of holes 220 may allow this sealant level to be visible outside of retaining structure 204.

Door mechanism 206 may be used to replace sealant cartridge 216. Door mechanism 206 may include door 222, hinge mechanism 224, and air cylinder 226. In this illustrative example, door mechanism 206 may be in closed state 227. Air cylinder 226 may be used to move door mechanism 206 between an open state (not shown) and closed state 227. When door mechanism 206 is in the open state, door 222 may be opened such that access to the interior of retaining structure 204 may be provided. When door mechanism 206 is in closed state 227, door 222 may be closed such that access to the interior of retaining structure 204 may be prevented.

When door mechanism 206 is moved into closed state 227, air cylinder 226 may have a certain level of air pressure. Air cylinder 226 may lose air pressure when the pressure of air within sealant cartridge 216 increases. When air cylinder 226 loses air pressure beyond some selected threshold, door mechanism 206 may be moved from closed state 227 to an open state.

In one illustrative example, air cylinder 226 may be operated using the robotic device (not shown) attached to attachment feature 214. This same robotic device or a different robotic device may then be used to insert sealant cartridge 216 into or remove sealant cartridge 216 from retaining structure 204. In this manner, the changing of sealant cartridges may be automated.

Dispensing device 208 may be configured to receive the sealant held within sealant cartridge 216 and then dispense this sealant onto a surface. Pneumatic tool 209 may be used to control the flow of sealant from sealant cartridge 216 to dispensing device 208.

As depicted, pneumatic tool 209 may include air pressure regulator 228, air hose 230, and a piston device (not shown in this view). Air pressure regulator 228 and air hose 230 may be examples of implementations for air pressure regulator 156 and air transfer element 158, respectively, in FIG. 1.

Air pressure regulator 228 may control the flow and/or pressure of pressurized air flowing through air hose 230 towards the piston device (not shown) to control the movement of the piston device relative to sealant cartridge 216. In this manner, the amount of pressure applied to the sealant within sealant cartridge 216 may be controlled and thus, the rate at which the sealant is extruded from sealant cartridge 216 may be controlled.

Sensor system 210 may include a pressure sensor (not shown) and a temperature sensor (not shown) configured to generate pressure data and temperature data, respectively, about the fluid being dispensed from dispensing device 208. Sensor system 210 may send this sensor data to controller 212. Controller 212 may use this sensor data to generate a number of commands for air pressure regulator 228. Controller 212 may then send the number of commands to air pressure regulator 228 wirelessly. In this manner, the operation of air pressure regulator 228 may be controlled using feedback provided by sensor system 210.

Figure 3:
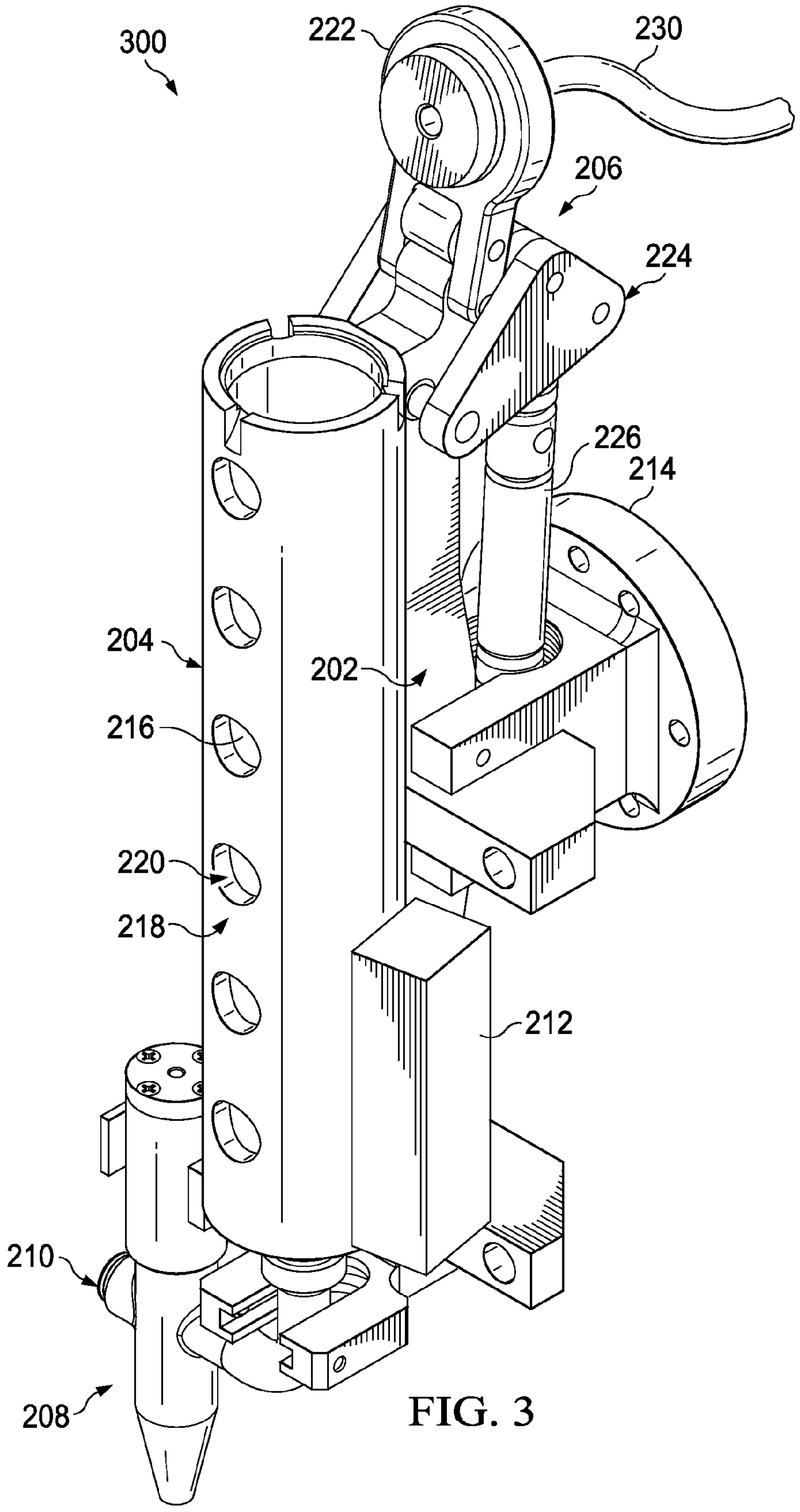
FIG. 3 is an illustration of a sealant dispensing system with a door mechanism in an open state in accordance with an illustrative embodiment.

With reference now to FIG. 3, an illustration of sealant dispensing system 200 from FIG. 2 with door mechanism 206 in an open state is depicted in accordance with an illustrative embodiment. In this illustrative example, door mechanism 206 has been moved from closed state 227 in FIG. 2 to open state 300.

Figure 4:
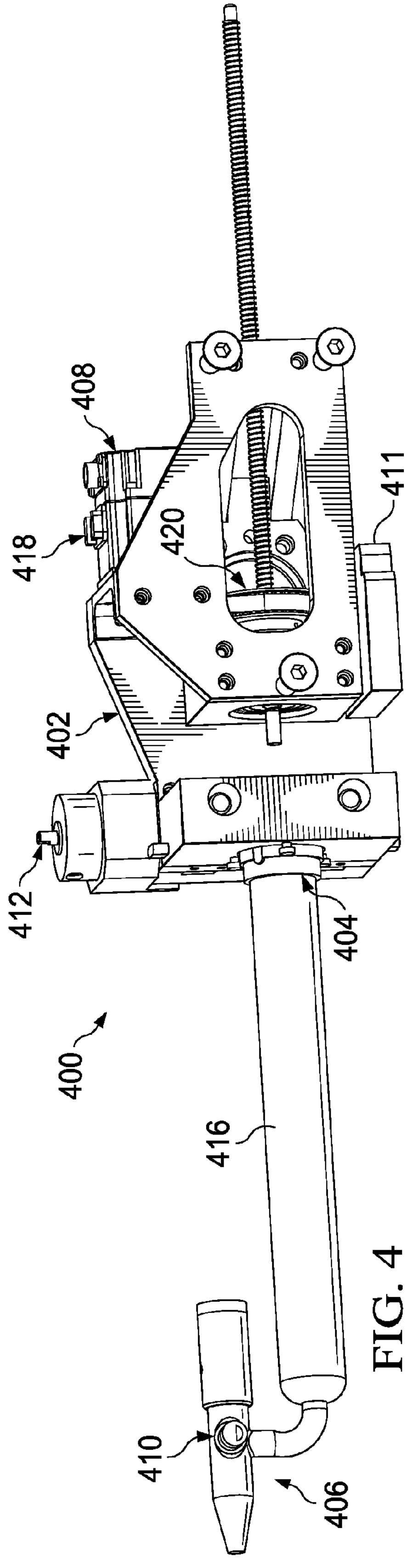
FIG. 4 is an illustration of another sealant dispensing system in accordance with an illustrative embodiment.

With reference now to FIG. 4, an illustration of another sealant dispensing system is depicted in accordance with an illustrative embodiment. In this illustrative example, sealant dispensing system 400 may be an example of one implementation for fluid dispensing system 100 in FIG. 1.

As depicted, sealant dispensing system 400 may include platform 402, retaining structure 404, dispensing device 406, mechanical tool 408, sensor system 410, controller 411, and attachment feature 412. Platform 402, retaining structure 404, dispensing device 406, mechanical tool 408, sensor system 410, controller 411, and attachment feature 412 may be examples of implementations for platform 102, retaining structure 104, dispensing device 108, mechanical tool 146, sensor system 110, controller 111, and attachment feature 112, respectively, in FIG. 1.

In this illustrative example, attachment feature 412 may be associated with platform 402 and configured for use in attaching platform 402 to a robotic device, such as, for example, without limitation, robotic device 114 in FIG. 1.

Retaining structure 404 may be associated with platform 402 and configured to hold sealant cartridge 416. Dispensing device 406 may be configured to receive the sealant held within sealant cartridge 416 and then dispense this sealant onto a surface. Mechanical tool 408 may be used to control the flow of sealant from sealant cartridge 416 to dispensing device 406.

As depicted, mechanical tool 408 may include motor 418 and plunger 420. Motor 418 and plunger 420 may be examples of implementations of motor 150 and plunger 148, respectively, in FIG. 1. Plunger 420 may be pushed against the sealant held within sealant cartridge 416 to extrude the sealant from sealant cartridge 416. Motor 418 may control the distance per second by which plunger 420 is moved relative to sealant cartridge 416. In this manner, motor 418 may control the rate at which the sealant is extruded from sealant cartridge 416.

Sensor system 410 may include a pressure sensor (not shown) and a temperature sensor (not shown) configured to generate pressure data and temperature data, respectively, about the fluid being dispensed from dispensing device 406. Sensor system 410 may send this sensor data to controller 411. Controller 411 may use this sensor data to generate a number of commands for motor 418. Controller 411 may then send the number of commands to motor 418 wirelessly. In this manner, the operation of motor 418 may be controlled using feedback provided by sensor system 410.

The illustrations of sealant dispensing system 200 in FIG. 2 and sealant dispensing system 400 in FIG. 4 are not meant to imply physical or architectural limitations to the manner in which an illustrative embodiment may be implemented. Other components in addition to or in place of the ones illustrated may be used. Some components may be optional.

The different components shown in FIGS. 2-3 may be illustrative examples of how components shown in block form in FIG. 1 can be implemented as physical structures. Additionally, some of the components in FIGS. 2-3 may be combined with components in FIG. 1, used with components in FIG. 1, or a combination of the two.

Figure 5:
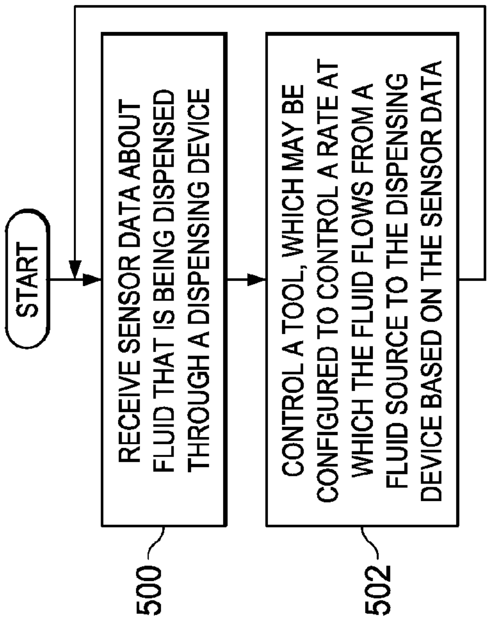
FIG. 5 is an illustration of a process for controlling a fluid dispensing device in the form of a flowchart in accordance with an illustrative embodiment.

With reference now to FIG. 5, an illustration of a process for controlling a fluid dispensing device is depicted in the form of a flowchart in accordance with an illustrative embodiment. The process illustrated in FIG. 5 may be implemented using fluid dispensing system 100 in FIG. 1. In particular, the process illustrated below may be implemented using controller 111 in FIG. 1.

The process may begin by receiving sensor data 136 about fluid 118 that is being dispensed through dispensing device 108 (operation 500). In operation 500, sensor data 136 may be received from sensor system 110 associated with dispensing device 108. Sensor data 136 may include pressure data 141, temperature data 143, and/or other types of data.

Thereafter, tool 109, which may be configured to control rate 135 at which fluid 118 flows from fluid source 105 to dispensing device 108 may be controlled based on sensor data 136 (operation 502). The process may then return to operation 500 as described above. In one illustrative example, this process may be continuously performed during the entire fluid dispensing operation. In this manner, the rate at which fluid 118 is extruded from fluid source 105 to dispensing device

108 may be continuously adjusted based on feedback provided in the form of sensor data 136.

Figure 6:
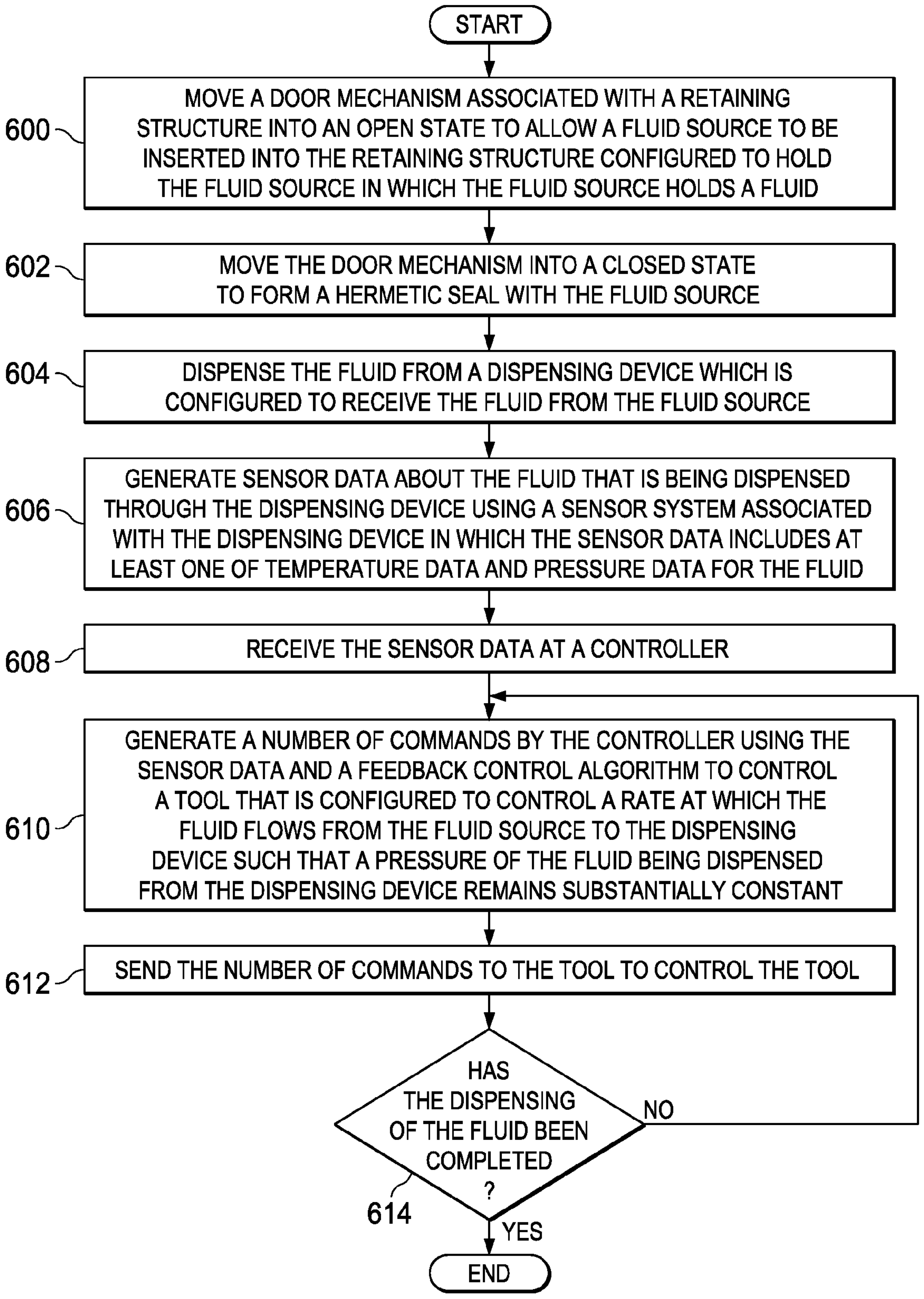
FIG. 6 is an illustration of a process for controlling a dispensing of a fluid in the form of a flowchart in accordance with an illustrative embodiment.

With reference now to FIG. 6, an illustration of a process for controlling a dispensing of a fluid is depicted in the form of a flowchart in accordance with an illustrative embodiment. The process illustrated in FIG. 6 may be implemented using fluid dispensing system 100 in FIG. 1. In particular, the process illustrated below may be implemented using controller 111 in FIG. 1.

The process may begin by moving door mechanism 106 associated with retaining structure 104 into open state 131 to allow fluid source 105 to be inserted into retaining structure 104 configured to hold fluid source 105 in which fluid source 105 holds fluid 118 (operation 600). Next, door mechanism 106 may be moved into closed state 133 to form hermetic seal 160 with fluid source 105 (operation 602). Fluid 118 may then be dispensed from dispensing device 108 which is configured to receive fluid 118 from fluid source 105 (operation 604).

Sensor data 136 about fluid 118 that is being dispensed through dispensing device 108 may be generated using sensor system 110 associated with dispensing device 108 in which sensor data 136 includes at least one of temperature data 143 and pressure data 141 for fluid 118 (operation 606). Sensor data 136 may be received at controller 111 (operation 608). Number of commands 145 may be generated by controller 111 using sensor data 136 and feedback control algorithm 144 to control tool 109 that is configured to control rate 135 at which fluid 118 flows from fluid source 105 to dispensing device 108 such that a pressure of fluid 118 being dispensed from dispensing device 108 remains substantially constant (operation 610). Number of commands 145 may be sent to tool 109 to control tool 109 (operation 612).

A determination may then be made as to whether the dispensing of fluid 118 has been completed (operation 614). If the dispensing of fluid 118 has been completed, the process terminates. Otherwise, the process returns to operation 610 as described above. In this illustrative example, operation 604 and operation 606 may be continuously performed until the dispensing of fluid 118 has been completed. The dispensing of fluid 118 may be completed when a selected amount of fluid 118 has been dispensed, when the portion of a surface to be covered by fluid 118 has been completely covered, and/or based on other factors. In this manner, operation 610 and operation 612 may be performed to form a feedback control loop for the dispensing of fluid 118 from dispensing device 108.

Figure 7:
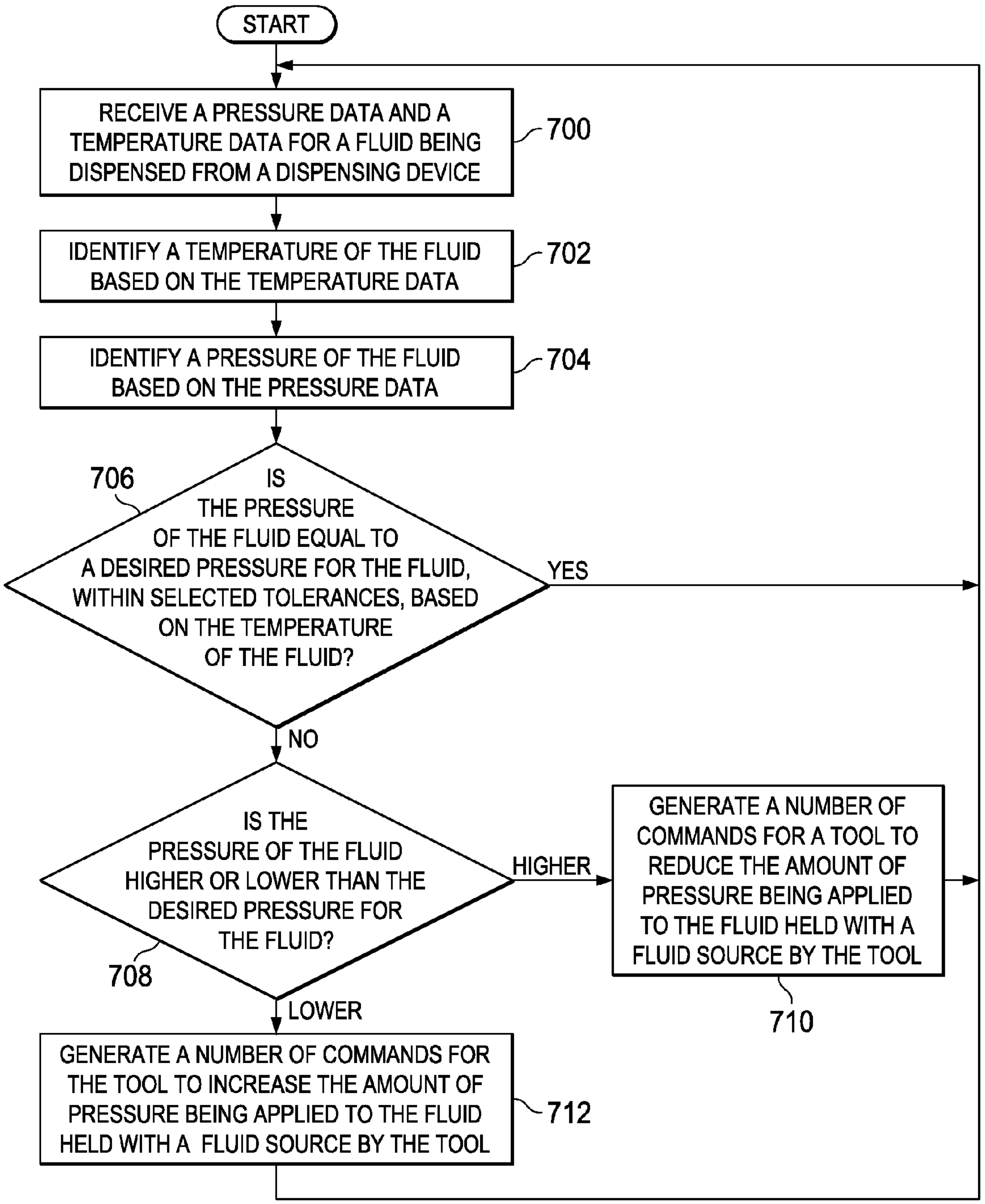
FIG. 7 is an illustration of a process for controlling a fluid dispensing device in the form of a flowchart in accordance with an illustrative embodiment.

With reference now to FIG. 7, an illustration of a process for controlling a fluid dispensing device is depicted in the form of a flowchart in accordance with an illustrative embodiment. The process illustrated in FIG. 7 may be implemented using fluid dispensing system 100 in FIG. 1. This process may be used to implement operations 500 and 502 described in FIG. 5 when sensor data 136 received in operation 500 in FIG. 5 includes both temperature data 143 and pressure data 141 in FIG. 1.

The process may begin by receiving pressure data 141 and temperature data 143 for fluid 118 being dispensed from dispensing device 108 (operation 700). A temperature of fluid 118 may be identified based on temperature data 143 (operation 702). Next, a pressure of fluid 118 may be identified based on pressure data 141 (operation 704).

In operation 702, the temperature identified may be an indication of viscosity 120 of fluid 118. Controller 111 may use the identified temperature and pressure of fluid 118 to determine whether fluid 118 is flowing as desired, more easily than desired, or less easily than desired.

Thereafter, a determination may be made as to whether the pressure of fluid 118 is equal to a desired pressure for fluid 118, within selected tolerances, based on the temperature of fluid 118 (operation 706). When the pressure is equal to the desired pressure, within selected tolerances, fluid 118 may be flowing as desired and the force, or pressure, being applied to fluid 118 by tool 109 may not need to be adjusted.

If the pressure of fluid 118 is equal to the desired pressure for fluid 118 within selected tolerances, the process returns to operation 700 as described above. Otherwise, the process determines whether the pressure of fluid 118 is higher or lower than the desired pressure for fluid 118 (operation 708). When the pressure is higher than the desired pressure, fluid 118 may be flowing more easily than desired and the force, or pressure, being applied to fluid 118 by tool 109 may be causing rate 135 and/or amount of fluid 118 flowing to dispensing device 108 to be greater than desired. Conversely, when the pressure is lower than the desired pressure, fluid 118 may be flowing less easily than desired and the force, or pressure, being applied to fluid 118 by tool 109 may be causing rate 135 and/or amount of fluid 118 flowing to dispensing device 108 to be less than desired.

With reference to operation 708, if the pressure of fluid 118 is higher than the desired pressure, number of commands 145 may be generated for tool 109 to reduce the amount of pressure being applied to fluid 118 held within fluid source 105 by tool 109 (operation 710). The process may then return to operation 700 as described above.

With reference again to operation 708, if the pressure of fluid 118 is lower than the desired pressure, number of commands 145 may be generated for tool 109 to increase the amount of pressure being applied to fluid 118 held within fluid source 105 by tool 109 (operation 712). The process may then return to operation 700 as described above.

The process described above may be repeated continuously during the dispensing of fluid 118 from dispensing device 108. In this manner, pressure data 141 and temperature data 143 provide feedback control data that may be used to control the use of tool 109 in dispensing fluid 118.

Figure 8:
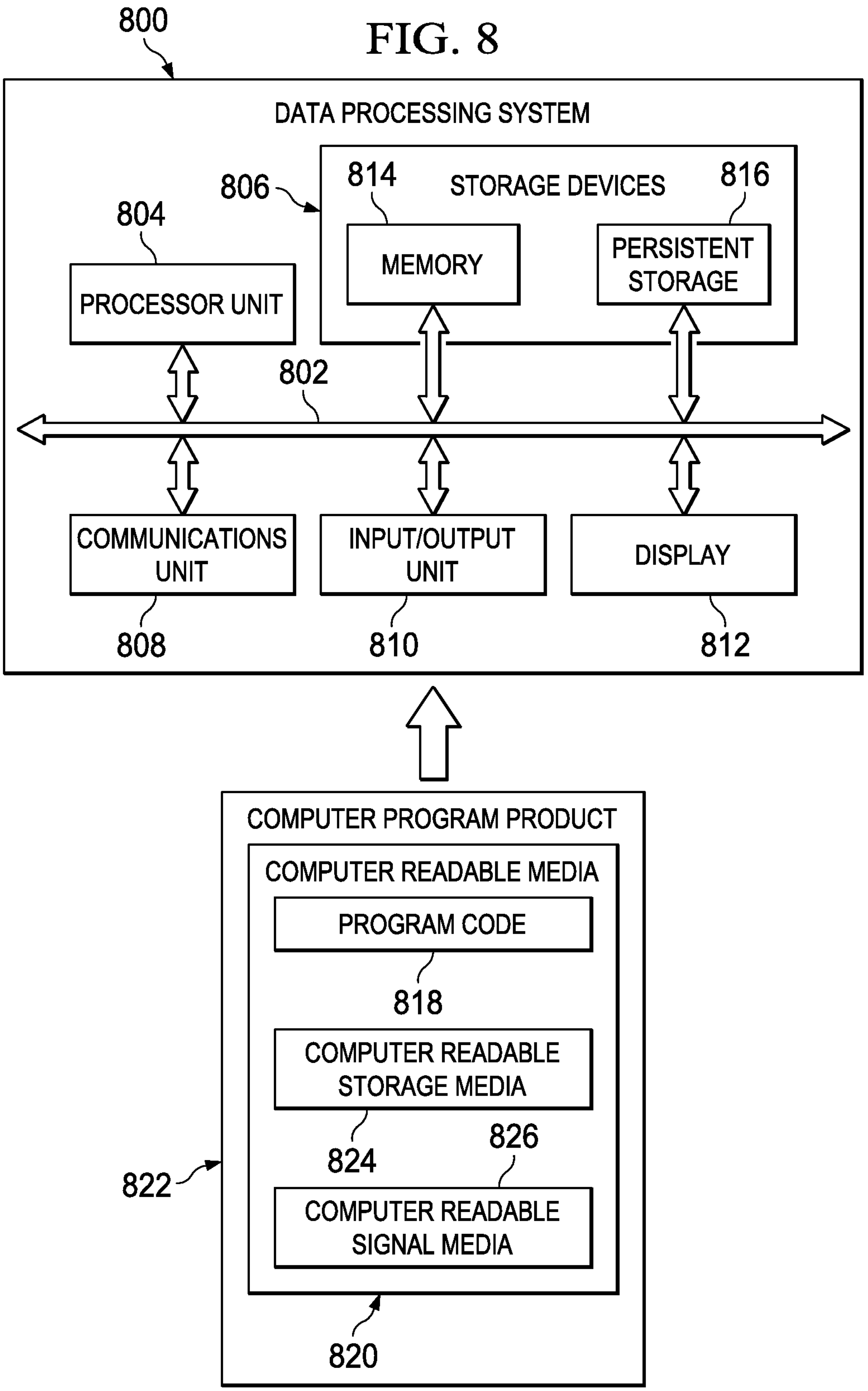
FIG. 8 is an illustration of a data processing system in the form of a block diagram in accordance with an illustrative embodiment.

Turning now to FIG. 8, an illustration of a data processing system is depicted in the form of a block diagram in accordance with an illustrative embodiment. Data processing system 800 may be used to implement controller 111 in FIG. 1. As depicted, data processing system 800 includes communications framework 802, which provides communications between processor unit 804, storage devices 806, communications unit 808, input/output unit 810, and display 812. In some cases, communications framework 802 may be implemented as a bus system.

Processor unit 804 is configured to execute instructions for software to perform a number of operations. Processor unit 804 may comprise a number of processors, a multi-processor core, and/or some other type of processor, depending on the implementation. In some cases, processor unit 804 may take the form of a hardware unit, such as a circuit system, an application specific integrated circuit (ASIC), a programmable logic device, or some other suitable type of hardware unit.

Instructions for the operating system, applications, and/or programs run by processor unit 804 may be located in storage devices 806. Storage devices 806 may be in communication with processor unit 804 through communications framework 802. As used herein, a storage device, also referred to as a computer readable storage device, is any piece of hardware capable of storing information on a temporary and/or permanent basis. This information may include, but is not limited to, data, program code, and/or other information.

Memory 814 and persistent storage 816 are examples of storage devices 806. Memory 814 may take the form of, for example, without limitation, a random access memory or some type of volatile or non-volatile storage device. Persistent storage 816 may comprise any number of components or devices. For example, without limitation, persistent storage 816 may comprise a hard drive, a flash memory, a rewritable optical disk, a rewritable magnetic tape, or some combination of the above. The media used by persistent storage 816 may or may not be removable.

Communications unit 808 allows data processing system 800 to communicate with other data processing systems and/or devices. Communications unit 808 may provide communications using physical and/or wireless communications links.

Input/output unit 810 allows input to be received from and output to be sent to other devices connected to data processing system 800. For example, input/output unit 810 may allow user input to be received through a keyboard, a mouse, and/or some other type of input device. As another example, input/output unit 810 may allow output to be sent to a printer connected to data processing system 800.

Display 812 is configured to display information to a user. Display 812 may comprise, for example, without limitation, a monitor, a touch screen, a laser display, a holographic display, a virtual display device, and/or some other type of display device.

In this illustrative example, the processes of the different illustrative embodiments may be performed by processor unit 804 using computer-implemented instructions. These instructions may be referred to as program code, computer usable program code, or computer readable program code and may be read and executed by one or more processors in processor unit 804.

In these examples, program code 818 is located in a functional form on computer readable media 820, which is selectively removable, and may be loaded onto or transferred to data processing system 800 for execution by processor unit 804. Program code 818 and computer readable media 820 together form computer program product 822. In this illustrative example, computer readable media 820 may be computer readable storage media 824 or computer readable signal media 826.

Computer readable storage media 824 is a physical or tangible storage device used to store program code 818 rather than a medium that propagates or transmits program code 818. Computer readable storage media 824 may be, for example, without limitation, an optical or magnetic disk or a persistent storage device that is connected to data processing system 800.

Alternatively, program code 818 may be transferred to data processing system 800 using computer readable signal media 826. Computer readable signal media 826 may be, for example, a propagated data signal containing program code 818. This data signal may be an electromagnetic signal, an optical signal, and/or some other type of signal that can be transmitted over physical and/or wireless communications links.

The illustration of data processing system 800 in FIG. 8 is not meant to provide architectural limitations to the manner in which the illustrative embodiments may be implemented. The different illustrative embodiments may be implemented in a data processing system that includes components in addition to or in place of those illustrated for data processing system 800. Further, components shown in FIG. 8 may be varied from the illustrative examples shown.

Figure 9:
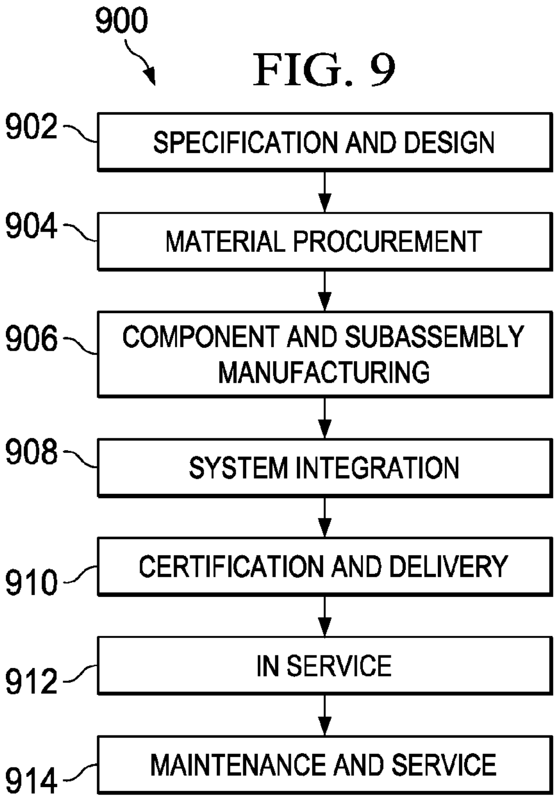
FIG. 9 is an illustration of an aircraft manufacturing and service method in the form of a flowchart in accordance with an illustrative embodiment.

Illustrative embodiments of the disclosure may be described in the context of aircraft manufacturing and service method 900 as shown in FIG. 9 and aircraft 900 as shown in FIG. 9. Turning first to FIG. 9, an illustration of an aircraft manufacturing and service method is depicted in the form of a flowchart in accordance with an illustrative embodiment. During pre-production, aircraft manufacturing and service method 900 may include specification and design 902 of aircraft 1000 in FIG. 10 and material procurement 904.

Figure 10:
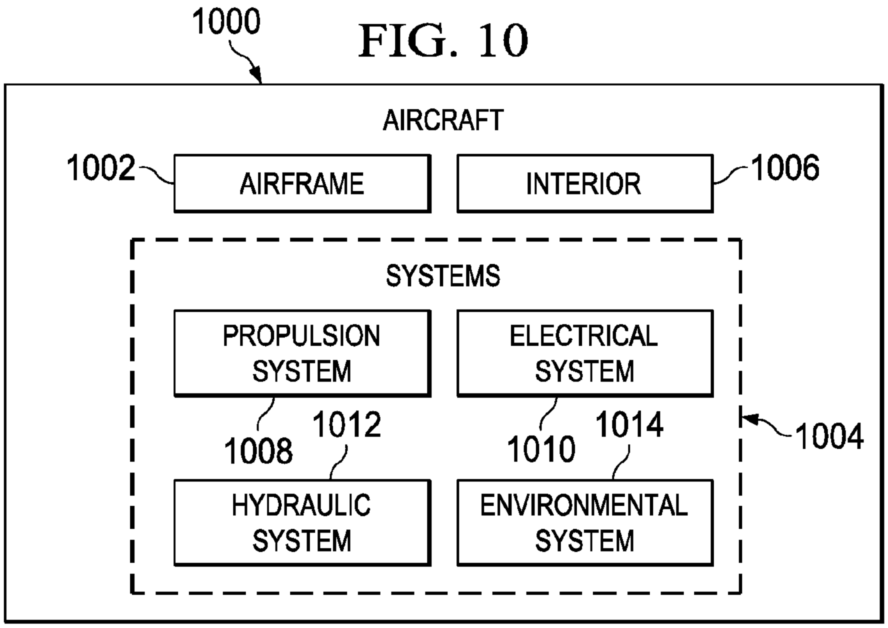
FIG. 10 is an illustration of an aircraft in the form of a block diagram in which an illustrative embodiment may be implemented.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in the form of a block diagram in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In particular, fluid dispensing system 100 from FIG. 1 may be used during any one of the stages of aircraft manufacturing and service method 900. For example, without limitation, fluid dispensing system 100 from FIG. 1 may be used to dispense and apply sealant 124 onto one or more surfaces and/or interfaces during at least one of component and subassembly manufacturing 906, system integration 908, in service 912, routine maintenance and service 914, or some other stage of aircraft manufacturing and service method 900.

For example, without limitation, fluid dispensing system 100 in FIG. 1 may be used to dispense and apply sealant 124 onto one or more surfaces and/or interfaces used in the assembly of airframe 1002 of aircraft 1000 during component and subassembly manufacturing 906. In some cases, fluid dispensing system 100 in FIG. 1 may be used to dispense and apply sealant 124 onto one or more surfaces of interior 1006, propulsion system 1008, and/or hydraulic system 1012 of aircraft 1000.

In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912 and/or during maintenance and service 914 in FIG. 9. The use of a number of the different illustrative embodiments may substantially expedite the assembly of and/or reduce the cost of aircraft 1000.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the illustrative embodiments may provide an automated method and apparatus for dispensing sealant, such as sealant 124 in FIG. 1. In particular, a pressure of sealant 124 and/or rate 135 at which sealant 124 is extruded from sealant cartridge 126 may be monitored and controlled using feedback provided in the form of sensor data 136. In particular, fluid dispensing system 100 may be used to accurately dispense sealant 124 continuously such that a consistent bead of sealant 124 may be applied at a substantially constant rate to a surface or interface.

The feedback control system provided by sensor system 110, controller 111, and tool 109 may be used to recover from air bubbles that may be present within sealant 124 to maintain a desired pressure and/or flow rate for sealant 124.

Further, the illustrative embodiments may provide door mechanism 106 for use with retaining structure 104. Door mechanism 106 may be operated by robotic device 114 such that pre-filled sealant cartridges may be inserted into and ejected from retaining structure 104 quickly. In this manner, the changing of sealant cartridges for fluid dispensing system 100 may be automated.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:

a sensor system associated with a dispensing device and configured to generate sensor data about fluid being dispensed from the dispensing device;

a controller configured to receive the sensor data, identify a pressure of the fluid using the sensor data, and control a tool configured to move the fluid from a fluid source to the dispensing device based on the pressure identified to control a rate at which the fluid flows from the fluid source to the dispensing device;

a retaining structure configured to hold the fluid source; and a door mechanism associated with the retaining structure, wherein the door mechanism is configured to be moved between an open state and a closed state.

2. The apparatus of claim 1, wherein the sensor system comprises at least one of:

a pressure sensor configured to generate pressure data for the fluid being dispensed from the dispensing device; and a temperature sensor configured to generate temperature data for the fluid being dispensed from the dispensing device.

3. The apparatus of claim 2, wherein the controller identifies the pressure of the fluid using the pressure data and a temperature of the fluid using the temperature data and wherein the controller determines whether a force being applied by the tool to move the fluid from the fluid source to the dispensing device needs to be increased or decreased based on the pressure identified and the temperature identified.

4. The apparatus of claim 3, wherein the controller is configured to generate a number of commands to control the force being applied by the tool.

5. The apparatus of claim 1, wherein the controller uses the sensor data and a feedback control algorithm to generate a number of commands to control the tool.

6. The apparatus of claim 5, wherein the controller is configured to generate the number of commands needed to control the tool using the sensor data and the feedback control algorithm such that a pressure of the fluid being dispensed from the dispensing device remains substantially constant.

7. The apparatus of claim 1, wherein the tool is a mechanical tool comprising:

a plunger configured to be moved relative to the fluid source to control the rate at which the fluid flows from the fluid source to the dispensing device; and a motor configured to control movement of the plunger relative to the fluid source.

8. The apparatus of claim 7, wherein the controller is configured to generate a number of commands for the motor based on the sensor data and send the number of commands to the motor.

9. The apparatus of claim 1, wherein the tool is a pneumatic tool comprising:

a piston device configured to be moved relative to the fluid source to control the rate at which the fluid flows from the fluid source to the dispensing device; and an air pressure regulator configured to control movement of the piston device relative to the fluid source.

10. The apparatus of claim 9, wherein the controller is configured to generate a number of commands for the air pressure regulator based on the sensor data and send the number of commands to the air pressure regulator.

11. The apparatus of claim 9, wherein the pneumatic tool further comprises:

an air transfer element configured to allow pressurized air to flow from the air pressure regulator towards the piston device.

12. The apparatus of claim 1, wherein the door mechanism is configured to be moved into the open state to allow the fluid source to be either removed from or inserted into the retaining structure.

13. The apparatus of claim 1, wherein the door mechanism is configured to be moved into the closed state to form a hermetic seal with the fluid source.

14. The apparatus of claim 1, wherein the door mechanism comprises:

a locking mechanism configured to lock the door mechanism in the closed state.

15. The apparatus of claim 1 further comprising:

an air cylinder configured to move the door mechanism between the open state and the closed state, wherein the door mechanism is configured to move from the closed state to the open state when the air cylinder loses air pressure beyond a selected threshold in response to a pressure of air within the fluid source increasing.

16. The apparatus of claim 1 further comprising:

a platform, wherein the door mechanism and the retaining structure are associated with the platform; and an attachment feature configured for use in attaching the platform to a robotic device.

17. The apparatus of claim 1, wherein the fluid is a sealant and wherein the fluid source is a sealant cartridge that is at least partially transparent and pre-filled with the sealant.

18. A fluid dispensing system comprising:

a platform;

a retaining structure associated with the platform and configured to hold a fluid source;

a dispensing device configured to receive a fluid from the fluid source and dispense the fluid;

a sensor system associated with the dispensing device in which the sensor system comprises at least one of:

a pressure sensor configured to measure a pressure of the fluid being dispensed from the dispensing device to generate pressure data for the fluid; and a temperature sensor configured to measure a temperature of the fluid being dispensed from the dispensing device to generate temperature data for the fluid;

a controller configured to receive the pressure data and the temperature data and to use the pressure data, the temperature data, and a feedback control algorithm to generate a number of commands to control a tool to control a rate at which the fluid flows from the fluid source to the dispensing device such that the pressure of the fluid being dispensed from the dispensing device remains substantially constant in which the tool is selected from one of a mechanical tool and a pneumatic tool; and a door mechanism associated with the retaining structure in which the door mechanism is configured to be moved between an open state and a closed state in which the open state allows the fluid source to be either removed from or inserted into the retaining structure and the closed state forms a hermetic seal with the fluid source.

19. A method for controlling a dispensing device comprising:

moving a door mechanism associated with a retaining structure into an open state to allow a fluid source to be inserted into the retaining structure;

moving the door mechanism to a closed state;

receiving sensor data about fluid that is being dispensed through the dispensing device;

identifying a pressure of the fluid using the sensor data;

controlling a tool configured to move the fluid from the fluid source to the dispensing device based on the pressure identified to control a rate at which the fluid flows from the fluid source to the dispensing device; and moving the door mechanism associated with the retaining structure into the open state to allow the fluid source to be removed from the retaining structure.

20. The method of claim 19 further comprising:

generating the sensor data using a sensor system associated with the dispensing device.

21. The method of claim 20, wherein generating the sensor data comprises at least one of:

measuring the pressure of the fluid using a pressure sensor associated with the dispensing device to generate pressure data for the fluid; and measuring a temperature of the fluid using a temperature sensor associated with the dispensing device to generate temperature data for the fluid.

22. The method of claim 19, wherein controlling the tool comprises:

generating a number of commands for the tool using the sensor data and a feedback control algorithm such that a pressure of the fluid being dispensed from the dispensing device remains substantially constant; and sending the number of commands to the tool to control the tool.

23. The method of claim 22, wherein sending the number of commands to the tool to control the tool comprises:

sending the number of commands to a motor to operate the motor, wherein the motor is configured to control movement of a plunger relative to the fluid source in which movement of the plunger relative to the fluid source controls the rate at which the fluid flows from the fluid source to the dispensing device.

24. The method of claim 22, wherein sending the number of commands to the tool comprises:

sending the number of commands to an air pressure regulator, wherein the air pressure regulator is configured to control movement of a piston device relative to the fluid source using pressurized air in which movement of the piston device relative to the fluid source controls the rate at which the fluid flows from the fluid source to the dispensing device.

25. The method of claim 19, wherein:

moving the door mechanism into the closed state forms a hermetic seal with the fluid source.

26. The method of claim 25, wherein moving the door mechanism into the open state and moving the door mechanism into the closed state are performed using a robotic device.

27. A method for controlling a dispensing of fluid, the method comprising:

moving a door mechanism associated with a retaining structure into an open state to allow a fluid source to be inserted into the retaining structure configured to hold the fluid source in which the fluid source holds the fluid;

moving the door mechanism into a closed state to form a hermetic seal with the fluid source;

dispensing the fluid from the dispensing device configured to receive the fluid from the fluid source;

generating sensor data about the fluid that is being dispensed through the dispensing device using a sensor system associated with the dispensing device in which the sensor data includes at least one of temperature data and pressure data for the fluid;

receiving the sensor data at a controller;

generating a number of commands using the sensor data and a feedback control algorithm to control a tool that is configured to control a rate at which the fluid flows from the fluid source to the dispensing device such that a pressure of the fluid being dispensed from the dispensing device remains substantially constant; and sending the number of commands to the tool to control the tool.

* * * * *